United States Patent
Lee et al.

(10) Patent No.: US 10,643,359 B2
(45) Date of Patent: May 5, 2020

(54) TRANSPARENT DISPLAY DEVICE, CONTROL METHOD THEREOF AND CONTROLLER THEREOF

(71) Applicants: Industrial Technology Research Institute, Hsinchu (TW); Intellectual Property Innovation Corporation, Hsinchu (TW)

(72) Inventors: Cheng-Chung Lee, Hsinchu (TW); Kuang-Jung Chen, Hsinchu County (TW); Sheng-Po Wang, Taoyuan (TW); Heng-Yin Chen, Hsinchu County (TW)

(73) Assignees: Industrial Technology Research Institute, Hsinchu (TW); Intellectual Property Innovation Corporation, Hsinchu (TW)

( * ) Notice: Subject to any disclaimer, the term of this patent is extended or adjusted under 35 U.S.C. 154(b) by 21 days.

(21) Appl. No.: 15/838,363

(22) Filed: Dec. 12, 2017

(65) Prior Publication Data

US 2018/0165857 A1   Jun. 14, 2018

Related U.S. Application Data

(60) Provisional application No. 62/433,217, filed on Dec. 12, 2016, provisional application No. 62/524,626, filed on Jun. 26, 2017.

(30) Foreign Application Priority Data

Nov. 9, 2017   (TW) .............................. 106138750 A

(51) Int. Cl.
*G06T 11/60*   (2006.01)
*G06F 3/01*   (2006.01)
(Continued)

(52) U.S. Cl.
CPC .............. *G06T 11/60* (2013.01); *G06F 3/011* (2013.01); *G06F 3/013* (2013.01); *G06F 3/0304* (2013.01);
(Continued)

(58) Field of Classification Search
CPC . G06T 11/60; G06T 7/70; G06F 3/011; G06F 3/0304; G06F 3/167; G06F 3/013;
(Continued)

(56) References Cited

U.S. PATENT DOCUMENTS 8,466,894 B2   6/2013   Sugita et al.
9,558,590 B2   1/2017   Westerinen et al.
(Continued)

FOREIGN PATENT DOCUMENTS

CN   201748927   2/2011
CN   102682742   9/2012
(Continued)

OTHER PUBLICATIONS

Office Action of Taiwan Counterpart Application, dated Nov. 19, 2018, pp. 1-15.
(Continued)

*Primary Examiner* — Ke Xiao
*Assistant Examiner* — Kim Thanh T Tran
(74) *Attorney, Agent, or Firm* — JCIPRNET

(57) ABSTRACT

A transparent display device, a control method thereof and a controller thereof are provided. The transparent display device includes a transparent display, a first sensor set, a second sensor set and a controller. The first sensor set senses user information in a first side. The second sensor set senses scene information in a second side. The controller analyzes and determines a location and a gaze direction of a user according to the user information, calculates a first fixation point in the scene information and a second fixation point on
(Continued)

the transparent display according to the location and the gaze direction of the user, determines a target object corresponding to the first fixation point according to the scene information, inquires target object information corresponding to the target object, and presents the target object information according to the second fixation point by the transparent display.

20 Claims, 13 Drawing Sheets

(51) Int. Cl.
*G06F 3/16* (2006.01)
*G06T 7/70* (2017.01)
*G06F 3/03* (2006.01)
*G06F 3/0488* (2013.01)

(52) U.S. Cl.
CPC ............... *G06F 3/167* (2013.01); *G06T 7/70* (2017.01); *G06F 3/017* (2013.01); *G06F 3/0488* (2013.01)

(58) Field of Classification Search
CPC ...... G06F 3/0488; G06F 3/017; G06F 3/0484; G06F 3/0487
USPC ......................................................... 345/633
See application file for complete search history.

(56) References Cited

U.S. PATENT DOCUMENTS

| | | | |
|---|---|---|---|
| 9,619,105 B1 | 4/2017 | Dal Mutto | |
| 2002/0114512 A1* | 8/2002 | Rao | G06K 9/4652 |
| | | | 382/165 |
| 2011/0074822 A1 | 3/2011 | Chang | |
| 2012/0176303 A1 | 7/2012 | Miyake | |
| 2013/0021518 A1* | 1/2013 | Hirai | H04N 5/23212 |
| | | | 348/348 |
| 2013/0265232 A1* | 10/2013 | Yun | G09G 3/3208 |
| | | | 345/158 |
| 2015/0339023 A1 | 11/2015 | Park et al. | |
| 2015/0358594 A1* | 12/2015 | Marshall | G06F 3/013 |
| | | | 345/419 |
| 2016/0314624 A1 | 10/2016 | Li et al. | |
| 2016/0321843 A1 | 11/2016 | Kasahara et al. | |
| 2017/0019595 A1 | 1/2017 | Chen et al. | |
| 2017/0140577 A1 | 5/2017 | Westerinen et al. | |

FOREIGN PATENT DOCUMENTS

| | | |
|---|---|---|
| CN | 102868897 | 1/2013 |
| CN | 104627078 | 5/2015 |
| CN | 104704444 | 6/2015 |
| CN | 104807855 | 7/2015 |
| CN | 105593787 | 5/2016 |
| CN | 106055218 | 10/2016 |
| TW | 201333753 | 8/2013 |
| TW | 201400865 | 1/2014 |
| TW | 201546657 | 12/2015 |
| TW | 201606352 | 2/2016 |
| TW | 201619760 | 6/2016 |
| TW | 201633256 | 9/2016 |

OTHER PUBLICATIONS

"Office Action of Taiwan Counterpart Application," dated Mar. 5, 2019, p. 1-p. 8.

* cited by examiner

TRANSPARENT DISPLAY DEVICE, CONTROL METHOD THEREOF AND CONTROLLER THEREOF

CROSS-REFERENCE TO RELATED APPLICATION

This application claims the priority benefit of U.S. provisional application Ser. No. 62/433,217, filed on Dec. 12, 2016, U.S. provisional application Ser. No. 62/524,626, filed on Jun. 26, 2017, and Taiwan application serial no. 106138750, filed on Nov. 9, 2017. The entirety of each of the above-mentioned patent applications is hereby incorporated by reference herein and made a part of this specification.

BACKGROUND OF THE DISCLOSURE

Field of the Disclosure

The disclosure relates to a transparent display device, a control method thereof and a controller thereof.

Description of Related Art

In many scene spots, for example, the Tokyo tower or a viewing deck on a top floor of the Taipei 101 building, tourists may look far into the distance to view a lot of beautiful scenery; in an aquarium, the tourists may see many marine lives; and in a museum, the tourists may see many antiques. However, the tourists are probably not familiar with related information of the viewing building, scene spot, marine lives or antiques, for example, a name, origin, story, introduction, etc. of the scenery. Therefore, operators of the scene spots generally additionally fabricate information sources such as information boards, voice guides, etc. for the tourists to view and gain a better understanding of scene objects (for example, famous buildings, scene spots, marine lives, or antiques). However, these information sources still have a limitation due to a manner of presentation, for example, the information board probably shields a scene object, and cannot directly point out where the scene object is, and the voice guide cannot clearly point out where the scene object is.

Some of the operators hope to introduce a display technique having an augmented reality (AR) function to guidance and interpretation of the scene objects. The so-called "AR" refers to that through calculation of a position and an angle of a camera image plus an image analysis technique, virtual information presented on a display screen may be combined with and interacted with a real world scene. However, today's display technique having the AR function is generally used in collaboration with a portable wearable device (for example, a pair of glasses having the AR function) for implementation since a distance between the portable wearable device and a user is generally within a fixed range. However, to use a large transparent display to implement the AR function still has many bottlenecks to break through.

SUMMARY OF THE DISCLOSURE

The disclosure is directed to a transparent display device, a control method thereof and a controller thereof, by which coordinates and a gaze direction of a user are quickly associated with a target object in a scene through a plurality of methods, so as to opportunely present related information of the target object on a transparent display located between the user and the target object, and implement the augmented reality (AR) function.

An embodiment of the disclosure provides a transparent display device including a transparent display, a first sensor set, a second sensor set and a controller. The transparent display includes a first side and a second side opposite to the first side. A display area of the transparent display is visually transparent. The first sensor set senses user information in the first side. The second sensor set senses scene information in the second side. The controller is coupled to the transparent display, the first sensor set and the second sensor set. The controller receives the user information sensed by the first sensor set to analyze and determine a location and a gaze direction of a user, and the controller calculates a first fixation point in the scene information and a second fixation point on the transparent display according to the location and the gaze direction of the user, determines a target object corresponding to the first fixation point according to the scene information, inquires target object information corresponding to the target object, and controls the transparent display to present the target object information according to the second fixation point.

An embodiment of the disclosure provides a control method of a transparent display device. The transparent display device includes a transparent display, a first sensor set and a second sensor set. The control method includes following steps: sensing user information in a first side of the transparent display; sensing scene information in a second side of the transparent display, wherein the second side is opposite to the first side; analyzing and determining a location and a gaze direction of a user according to the user information; calculating a first fixation point in the scene information and a second fixation point on the transparent display according to the location and the gaze direction of the user; determining a target object corresponding to the first fixation point according to the scene information; and inquiring target object information corresponding to the target object, and controlling the transparent display to present the target object information according to the second fixation point.

An embodiment of the disclosure provides a controller adapted to a transparent display device. The controller includes an input control module, a viewing area capturing module, an algorithm analysis module, an object identification module and an information display module. The input control module is coupled to a first sensor set of the transparent display device. The input control module receives user information in a first side of the transparent display device, and analyzes and determines a location and a gaze direction of a user according to the user information. The viewing area capturing module is coupled to a second sensor set of the transparent display device. The viewing area capturing module receives scene information in a second side of the transparent display device. The algorithm analysis module is coupled to the input control module and the viewing area capturing module. The algorithm analysis module calculates a first fixation point in the scene information and a second fixation point on the transparent display according to the location and the gaze direction of the user, and determines a target object corresponding to the first fixation point according to the scene information. The object identification module is coupled to the algorithm analysis module. The object identification module inquires target object information corresponding to the target object. The information display module is coupled to a transparent display in the transparent display device. The information display module controls the transparent display to present the target object information according to the second fixation point.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF EMBODIMENTS

Figure 1:
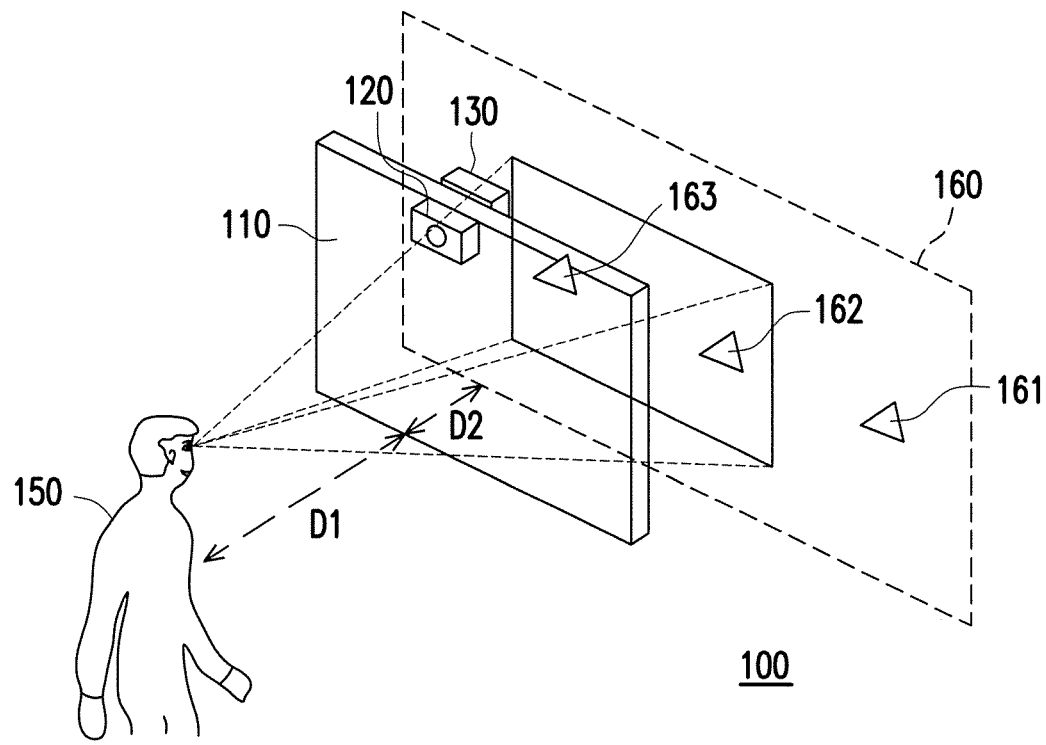
FIG. 1 is a schematic diagram of a transparent display device according to an embodiment of the disclosure.
Figure 2:
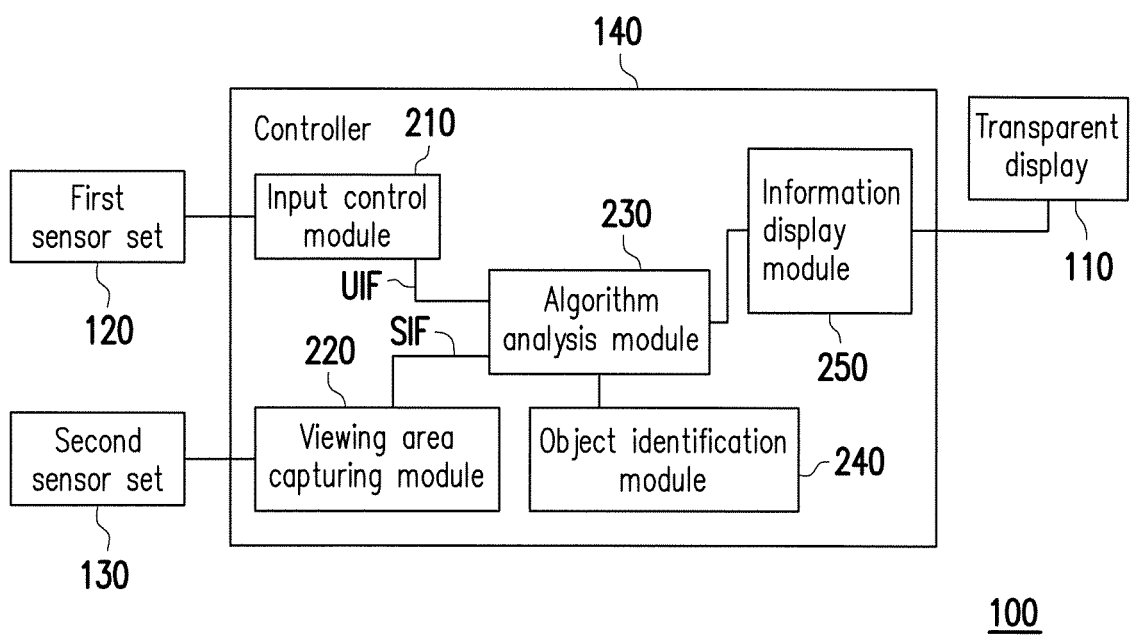
FIG. 2 is a block diagram of the transparent display device according to an embodiment of the disclosure.

FIG. 1 is a schematic diagram of a transparent display device 100 according to an embodiment of the disclosure. FIG. 2 is a block diagram of the transparent display device 100 according to an embodiment of the disclosure. Referring to FIG. 1 and FIG. 2, the transparent display device 100 includes a transparent display 110, a first sensor set 120, a second sensor set 130 and a controller 140. The transparent display 110 refers to that the display itself has a certain degree of light transmittance, and is capable of presenting a background behind the display panel. Namely, a display area of the transparent display 110 is visually transparent. The transparent display 110 of the present embodiment is adapted to a variety of applications such as windows in a building (a viewing deck, an aquarium, a museum), an exhibition window, a vehicle window and display, etc. The transparent display 110 of the present embodiment has a first side facing a user 150 and a second side facing scenery. Namely, the first side and the second side of the transparent display 110 are opposite to each other.

The first sensor set 120 is used for sensing user information in the first side of the transparent display 110. The second sensor set 130 is used for sensing scene information in the second side of the transparent display 110 (for example, scene information including a plurality of target objects 161-163 in FIG.1). A dotted frame 160 in FIG. 1 represents an image capturing plane 160 when the second sensor set 130 captures or senses the target objects 161-163. The first sensor set 120 is disposed on the outside of a body of the transparent display 110 facing the user and located at a middle line position of the transparent display 110 and located at a top part of the body of the transparent display 110, and the second first sensor set 130 is disposed on the outside of the body of the transparent display 110 facing the external scenery and located at the middle line position of the transparent display 110 and located at the top part of the body of the transparent display 110. A designer may also design the first sensor set 120 and the second sensor set 130 to be in the body of the transparent display 110, and dispose the first and second sensor sets 120 and 130 at a non-middle line position close to a left part of the transparent display 110 or close to a right part of the transparent display 110, or dispose the first sensor set 120 and the second sensor set 130 at other positions away from the body of the transparent display 110, for example, to decrease a configuration height of the first sensor set 120 according to a height of the user. Namely, the configuration positions of the first sensor set 120 and the second sensor set 130 are not limited by the disclosure as long as the first sensor set 120 may sense the user information in the first side of the transparent display 110 and the second sensor set 130 may sense the scene information in the second side of the transparent display 110.

The first sensor set 120 may be used for sensing a variety of information related to the user 150, for example, an image of the user, touch information, voice information, etc. of the user performed at the first side. In other words, the first sensor set 120 of the present embodiment at least includes a first image capturing device (for example, a planar camera or a three-dimensional (3D) camera). The first image capturing device is coupled to the controller 140, and is used for obtaining an image of in first side of the transparent display 110, where the image includes an image of the user 150. The first sensor set 120 may further include one of a touch sensor, an audio capturing device, an eyeball tracking device, an infrared sensor and a tilt sensor or a combination thereof. In the present embodiment, the touch sensor is disposed at the first side of the transparent display 110. When the touch sensor obtains a touch point of the user 150 at the first side of the transparent display 110, the touch point may be regarded as a fixation point of the user 150 on the transparent display 110. In this way, the transparent display device 100 may take a connection line between a position of the user 150 and the above fixation point as a gaze direction of the user 150, so as to learn a target object gazed by the user 150 in the scene information. The audio capturing device is used for receiving audio information of the user 150, and the controller may execute a corresponding operation according to the voice information of the user 150, for example, to control the transparent display device 100 to mark a specific building/a fish type, etc. in a voice manner. The first sensor set 120 in some of the embodiments may not have the touch sensor and the audio capturing device, and the corresponding functions are also absent.

The second sensor set 130 may obtain scene information viewed by the user 150 through the transparent display 110. The second sensor set 130 of the present embodiment at least includes a second image capturing device. The second image capturing device may be a 2D camera or a 3D camera. The second sensor set 130 may also be composed of a plurality of cameras. On the other hand, the second sensor set 130 may also be configured with specific sensors according to an actual requirement of a practitioner, for example, a sonar sensor, an infrared image sensor, etc., so as to obtain the scene information in the second side of the transparent display 110 under a specific environment. The practitioner may add other types of sensors to the first sensor set 120 and the second sensor set 130 according to an actual requirement for practical application, so as to enhance functionality of the transparent display device 100.

The controller 140 is coupled to the transparent display 110, the first sensor set 120 and the second sensor set 130. The controller 140 of the present embodiment may be implemented through a hardware device such as a system on a chip (SoC), a field programmable gate array (FPGA) chip, a complex programmable logic device (CPLD), a microprocessor, etc. The controller 140 of the present embodiment may further include a plurality of function modules. For example, the controller 140 includes an input control module 210, a viewing area capturing module 220, an algorithm analysis module 230, an object identification module 240 and an information display module 250. The algorithm analysis module 230 is coupled to the input control module 210, the viewing area capturing module 220, the object identification module 240 and the information display module 250. The input control module 210 is coupled to the first sensor set 120, and the viewing area capturing module 220 is coupled to the second sensor set 130. These function modules may be implemented by software in collaboration with the controller 140, or may be directly implemented by hardware circuits having the corresponding functions to construct the controller 140.

Figure 3:
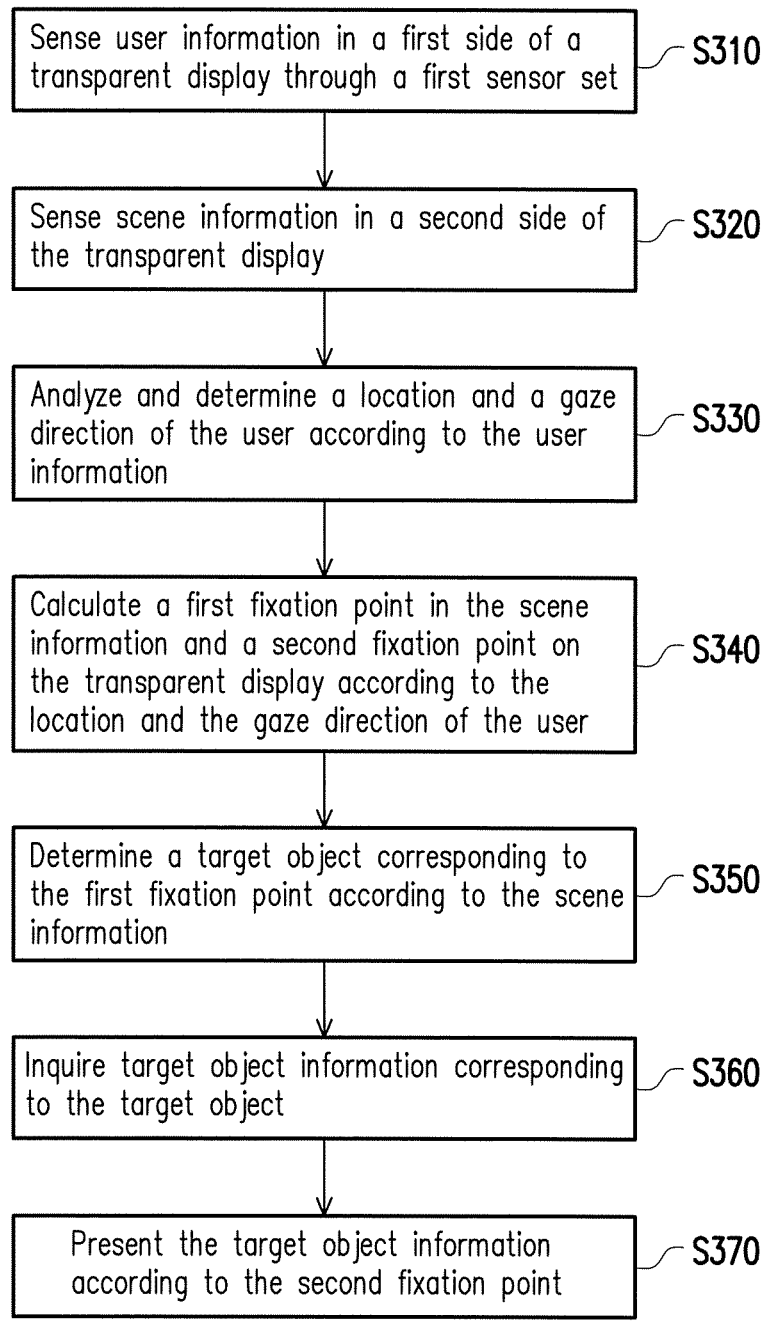
FIG. 3 is a flowchart illustrating a control method of a transparent display device according to an embodiment of the disclosure.

FIG. 3 is a flowchart illustrating a control method of a transparent display device according to an embodiment of the disclosure. The method flow of FIG. 3 may be implemented by the transparent display device 100 shown in FIG. 1 and FIG. 2. Referring to FIG. 2 and FIG. 3, in step S310, the input control module 210 in the controller 140 senses user information UIF related to the user 150 in the first side of the transparent display 110 through the first sensor set 120. The user information may be a user image, or depth information between the user 150 and the transparent display 140, touch information of the user 150, voice information of the user 150, eyeball tracking information of the user 150, etc.

In step S320, the viewing area capturing module 220 of the controller 140 senses scene information SIF in the second side of the transparent display 110 through the second sensor set 130. The scene information SIF may be obtained through techniques such as planar photography, sonar, infrared sensing, 3D photography, etc. The scene information SIF generally has a plurality of target objects. An execution sequence of the step S310 and the step S320 may be adjusted, and in the present embodiment, the steps S310 and S320 are continuously executed to opportunely sense the current user information UIF and the scene information SIF.

In step S330, the algorithm analysis module 230 of the controller 140 analyzes and determines a location and a gaze direction of the user 150 according to the user information UIF. In step S340, the algorithm analysis module 230 of the controller 140 calculates a first fixation point in the scene information and a second fixation point on the transparent display 110 according to the location and the gaze direction of the user 150. In step S350, after the first fixation point is obtained, the algorithm analysis module 230 of the controller 140 determines a target object corresponding to the first fixation point. In other words, the algorithm analysis module 230 of the controller 140 may determine the target object gazed by the user 150 in the scene information SIF through the first fixation point. In step S360, the algorithm analysis module 230 of the controller 140 inquires target object information corresponding to the target object in collaboration with the object identification module 240. The object identification module 240 may include a corresponding database for target object identification, for example, in case of the scenery area/aquarium/museum, a building database/fish type database/antique database may be used to implement the database in the object identification module 240. In step S370, the information display module 250 in the controller 140 presents the target object information according to the second fixation point. Implementations of the aforementioned steps S330 to S350 are described in detail below with reference to following FIG. 4 to FIG. 8.

Figure 4:
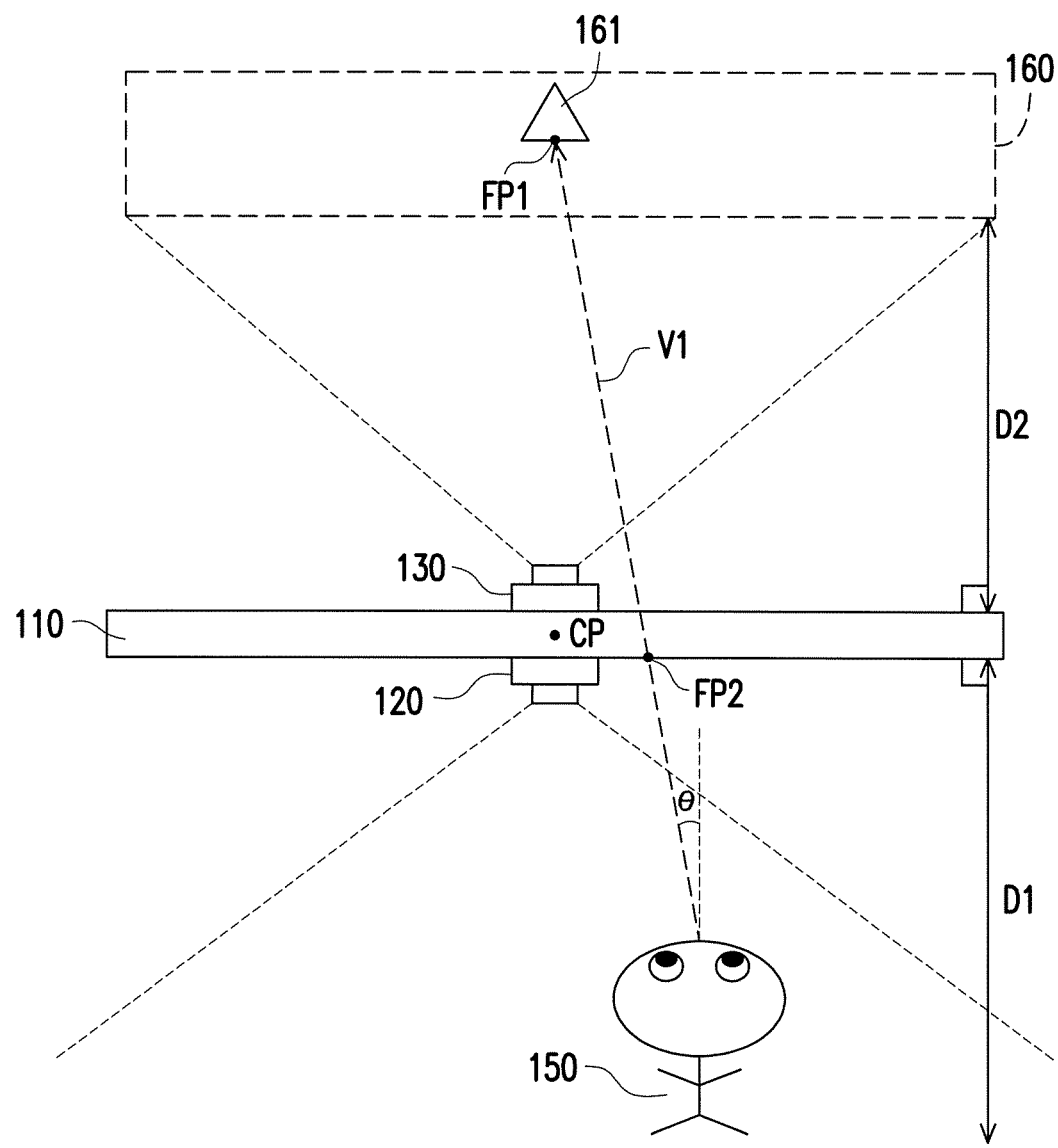
FIG. 4 is a schematic diagram of a transparent display device according to a first embodiment of the disclosure.

FIG. 4 is a schematic diagram of a transparent display device according to a first embodiment of the disclosure. Referring to FIG. 3 and FIG. 4, a center point CP of the transparent display 110 is taken as an origin of coordinates. In the present embodiment, the first sensor set 120 of FIG. 4 includes a depth image acquisition device (or referred to as a 3D camera), so that in the step S310 of FIG. 3, a location (represented as (Xu, Yu)) of the user 150, a distance D1 between the user 150 and the transparent display 110, and a gaze angle θ of the user 150 are directly obtained. The distance D1 is the shortest vertical distance between the user 150 and the transparent display 110. A gaze direction V1 of the user 150 may be generated according to the location (Xu, Yu) and the gaze angle θ of the user 150. The gaze angle θ includes an angle θx in an X-axis direction and an angle θy in a Y-axis direction. In a part of the embodiments of the disclosure, if touch information coordinates of the user 150 in the first side of the transparent display 110 are obtained, the gaze direction V1 may be generated according to a connection line between the location (Xu, Yu) of the user 150 and the touch information coordinates (which may be regarded as the second fixation point FP2).

In the embodiment of FIG. 4, the algorithm analysis module 230 extends the gaze direction V1 of the user 150 to a target object (for example, a target object 161) on an image taking plane 160 in the second side of the transparent display 110 to obtain the first fixation point FP1 (step S340), and searches whether the scene information SIF includes the target object according to a location of the first fixation point FP1 (step S350). The scene information of the present embodiment is an integration of information such as image information, target object coordinates, etc., and for simplicity's sake, the image capturing plane 160 and the target object in the image taking plane 160 are taken as a part of the scene information, so as to facilitate describing the embodiment of the disclosure. In other words, the algorithm analysis module 230 extends the gaze direction V1 to define the target object 161 in the image taking plane 160. The algorithm analysis module 230 in the controller 140 of the present embodiment cuts the scene information SIF to obtain a plurality of sub scene information by using an image clustering algorithm, where the sub scene information may include different target objects. Then, the algorithm analysis module 230 determines whether the first fixation point FP1 is located in one of the sub scene information, where the sub scene information indicated by the first fixation point FP1 may be referred to as concerned sub scene information. The algorithm analysis module 230 takes the concerned sub scene information as the target object 161. The image clustering algorithm is only one of applicable image analysis algorithms for searching the target object in the scene information SIF, and those skilled in the art may use other proper algorithms to each target objects from the scene information SIF. The object identification module 240 may inquire the target object information (for example, a building name/age of construction/story/related images) corresponding to the target object 161 according to the target object 161 (for example, a building) (step S360).

On the other hand, the algorithm analysis module 230 also extends the gaze direction V1 to the transparent display 110 to obtain the second fixation point FP2 on the transparent display 110. In this way, the information display module 250 may present the target object information according to the second fixation point FP2 (step S370). Coordinates (Xd, Yd) of the second fixation point FP2 may be calculated according to the location (Xu, Yu) of the user, the gaze angle θ and the distance D1, as shown in a following equation:

$$(Xd, Yd)=(Xu+D1\times\tan\theta x, Yu+D1\times\tan\theta y) \quad \text{F1}$$

In the present embodiment, the information display module 250 may also calculate a projection of the target object 161 on the transparent display 110 according to a relationship between the location of the user and the target object 161, and display the target object information according to the projection. The target object information may be presented in many different ways, for example, the target object 161 is continuously marked in form of a box, and a text and an image in the above target object information are displayed in form of a floating window beside the box. Moreover, the box is continuously appeared near the target object 161 without overlapping the target object 161 through an object tracking technique. Alternatively, an outline of the target object 161 is directly displayed by a dotted frame, and related target object information is displayed beside the dotted frame, so as to clearly mark the target object 161 and meanwhile display the related information to implement an augmented reality (AR) function. The information display module 250 may further sense a brightness of the scene information to properly adjust a text color in the target object information, for example, when the scene information corresponds to a daytime, the text is presented in a black color, and when the scene information corresponds to a nighttime, the text is presented in a white color.

Figure 5:
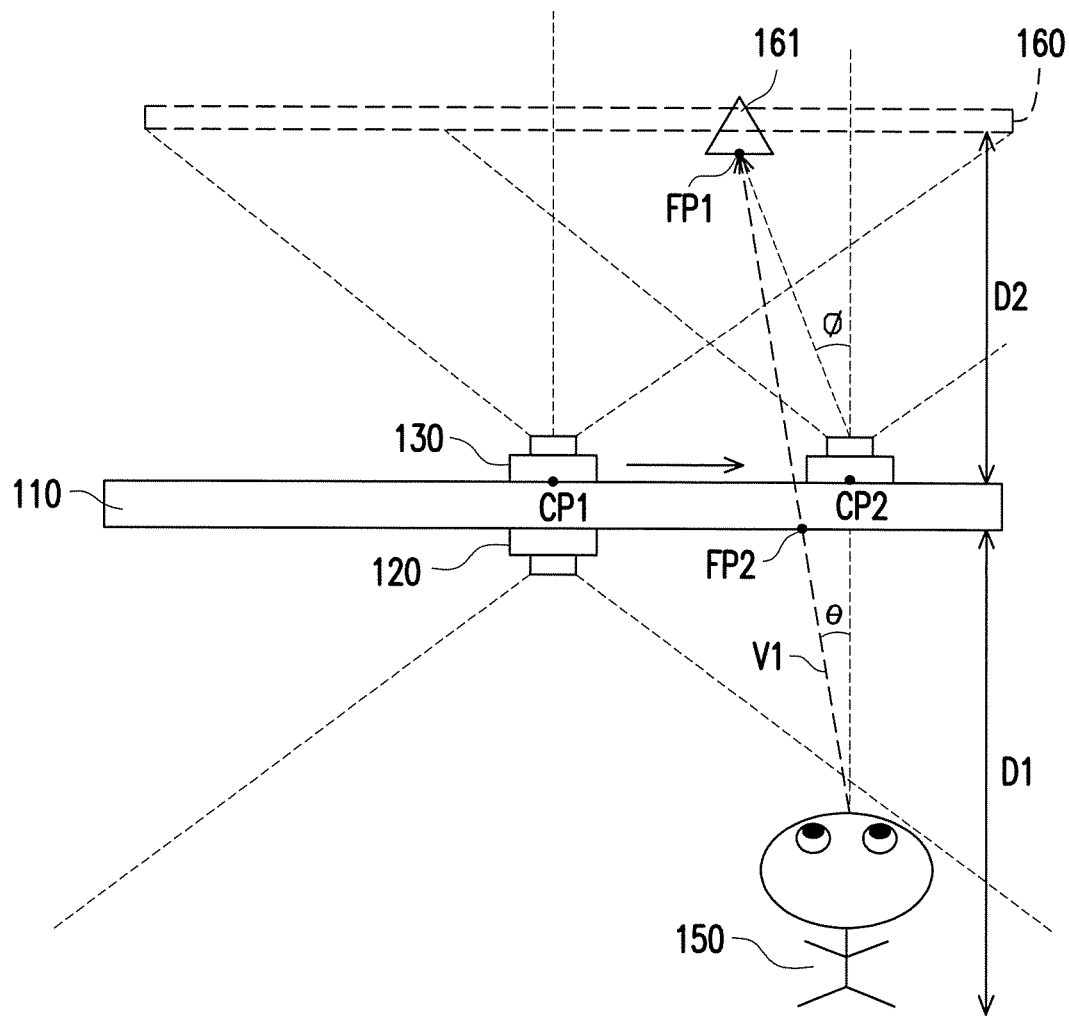
FIG. 5 is a schematic diagram of a transparent display device according to a second embodiment of the disclosure.
Figure 6:
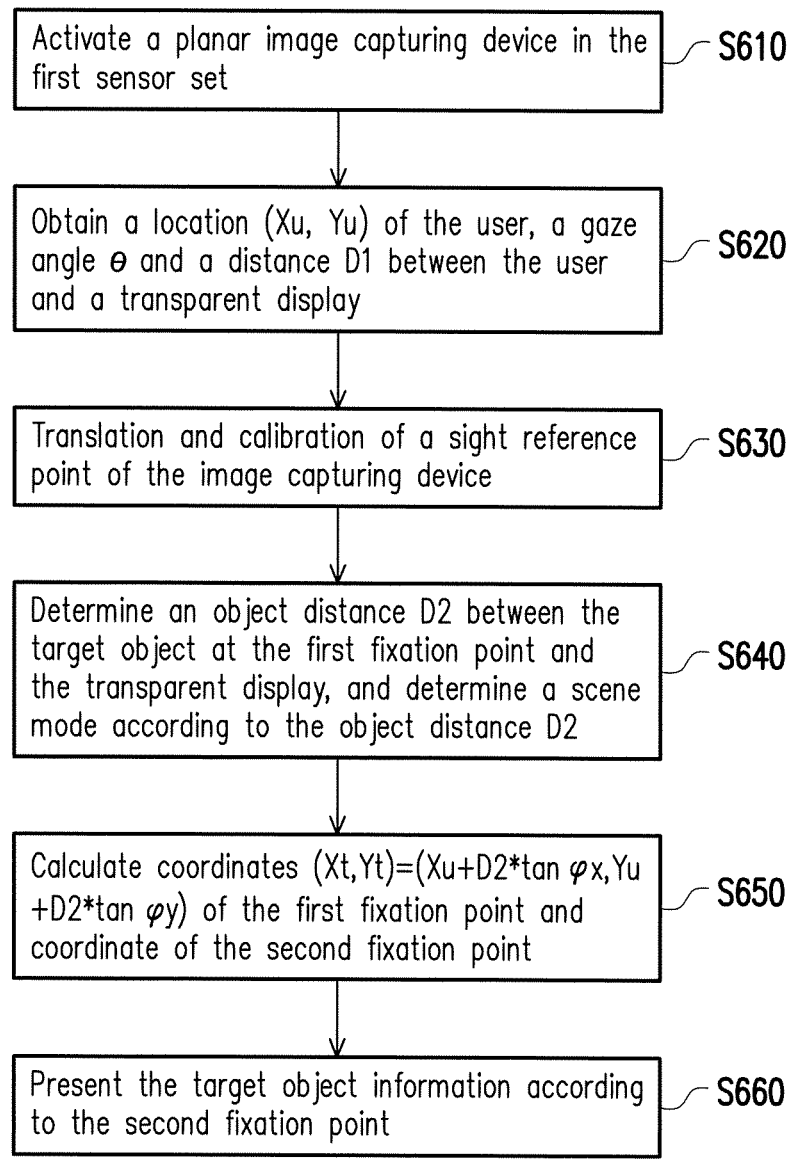
FIG. 6 is a flowchart illustrating a control method of the corresponding transparent display device according to the second embodiment of the disclosure.

FIG. 5 is a schematic diagram of a transparent display device according to a second embodiment of the disclosure. FIG. 6 is a flowchart illustrating a control method of the corresponding transparent display device according to the second embodiment of the disclosure. Referring to FIG. 3, FIG. 5 and FIG. 6, in the present embodiment, the image capturing device in the first sensor set 120 of FIG. 5 is a planar image capturing device, and in step S610 of FIG. 6, the planar image capturing device in the first sensor set 120 is activated. In the step S310 of FIG. 3 and a step S620 of FIG. 6, the location (Xu, Yu) of the user 150 is obtained, and the planar image capturing device in the first sensor set 120 captures a face image of the user 150 to calculate the gaze angle θ of the user 150 and the distance D1 between the user 150 and the transparent display 110. Those skilled in the art may calculate the gaze angle θ of the user 150 and the distance D1 by using many algorithms, which is not limited by the disclosure. In the present embodiment, in order to make the image capturing device in the first sensor set 120 to accurately search the target object 161 from the location of the user 150, in the step S330 of FIG. 3 and a step S630 of FIG. 6, after the location (Xu, Yu) of the user 150 is obtained, the controller 140 further controls the image capturing device of the first sensor set 120 to translate from an original location CP1 to a location CP2 closest to the location (Xu, Yu) of the user 150, so as to convert and calibrate a viewing angle of the image capturing device in the first sensor set 120. The above operation may be referred to as "translation and calibration of a sight reference point of the image capturing device". In the transparent display device of the present embodiment, a translation guide rail is designed at the first sensor set 120, such that a position of the image capturing device in the first sensor set 120 may be adjusted.

In step S640 of FIG. 6, the algorithm analysis module 230 in the controller 140 further determines an object distance D2 between the target object at the first fixation point FP1 and the transparent display 110, and determines a "scene mode" according to the object distance D2. The "scene mode" of the present embodiment includes a distant ground mode (i.e. the object distance D2 between the scene information SIF and the transparent display 110 is far greater than the distance D1 between the user 140 and the transparent display 110) and a foreground mode (i.e. the object distance D2 is not far greater than the distance D1). The algorithm analysis module 230 calculates the coordinates of the first fixation point FP1 on the image taking plane 160 according to different situation modes by using different equations. Since the image capturing device in the second sensor set 130 has been translated to the location CP2, the controller 140 requires to calculate an angle ϕ between the image capturing device in the second sensor set 130 and the target object 161.

If the object distance D2 is far greater than the distance D1, the controller 140 sets the "scene mode" to the distant ground mode, and the image capturing angle ϕ between the image capturing device in the second sensor set 130 and the target object 161 may be equal to the gaze angle θ of the user 150. On the other hand, if the object distance D2 is not far greater than the distance D1, the controller 140 sets the "scene mode" to the foreground mode. The image capturing angle ϕ between the image capturing device in the second sensor set 130 and the target object 161 may be calculated based on the gaze angle θ of the user 150 according to a following equation F2. The image capturing angle ϕ includes an image capturing angle ϕx in the X-axis direction and an image capturing angle ϕy in the Y-axis direction.

$$\Phi = \tan^{-1}\left(\tan\theta \times \left(\frac{D1+D2}{D1}\right)\right) \quad \text{F2}$$

In step S650 of FIG. 6, the algorithm analysis module 230 may also calculate coordinates (Xt, Yt) of the first fixation point FP1 according to the location (Xu, Yu) of the user 150, the image capturing angle ϕ between the image capturing device in the second sensor set 130 and the target object 161, and the object distance D2, as shown by a following equation F3.

$$(Xt, Yt)=(Xu+D2\times\tan\phi x, Yu+D2\times\tan\phi y) \quad \text{F3}$$

Coordinates of the second fixation point FP2 may be calculated according to the coordinates (Xt, Yt) of the first fixation point FP1, the location (Xd, Yd) of the user 150, the object distance D2 and the distance D1. In step S660 of FIG. 6, the information display module 250 of the controller 140 presents the target object information (for example, guide information) according the second fixation point.

Moreover, the input control module 210 of the controller 140 may selectively obtain required user information from a plurality of sensing devices in the first sensor set 120 according to the scene mode. The aforementioned "scene mode" may also include other modes, for example, a voice control mode, a touch mode, etc. When the scene mode is the voice control mode/the touch mode, the input control module 210 may neglect the image of the user, and only performs a corresponding operation based on a voice/touch coordinates of the user.

Figure 7:
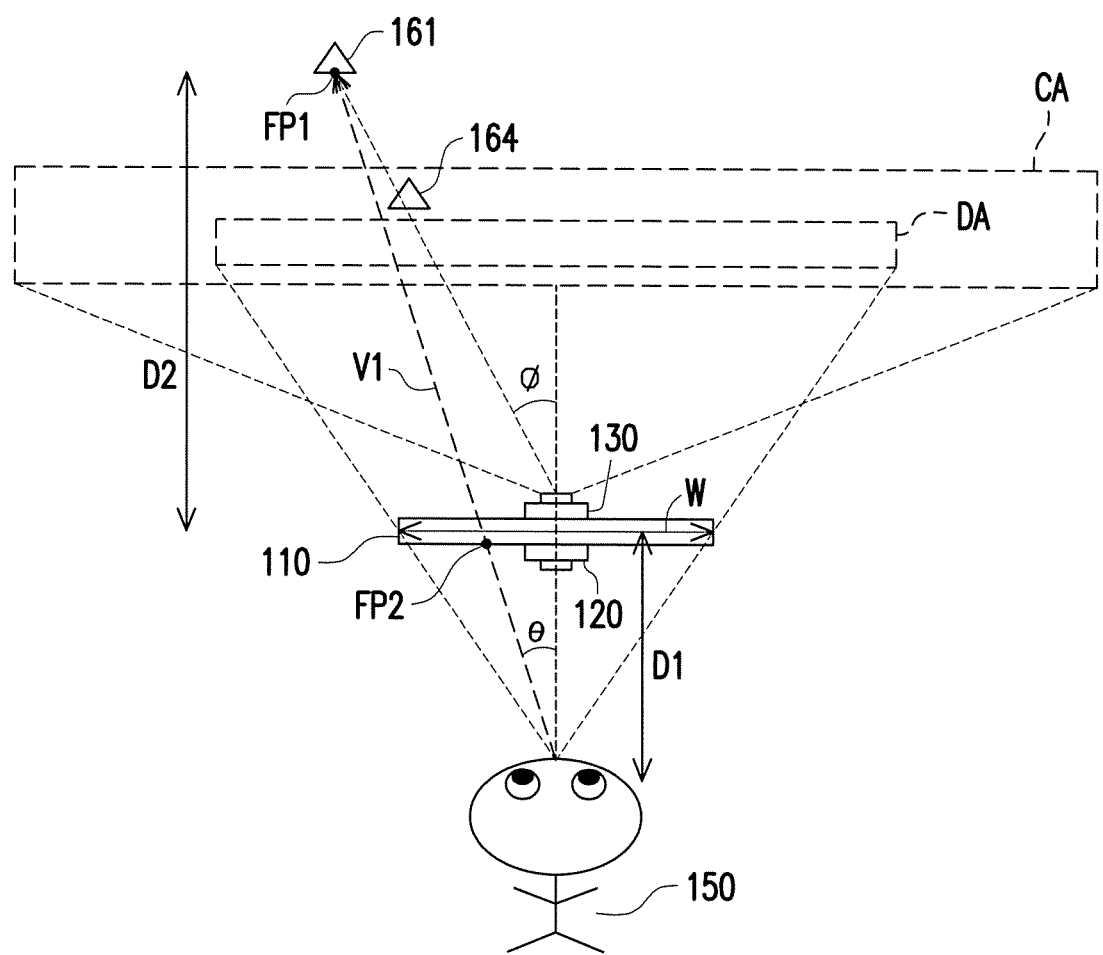
FIG. 7 is a schematic diagram of a transparent display device according to a third embodiment of the disclosure.
Figure 8:
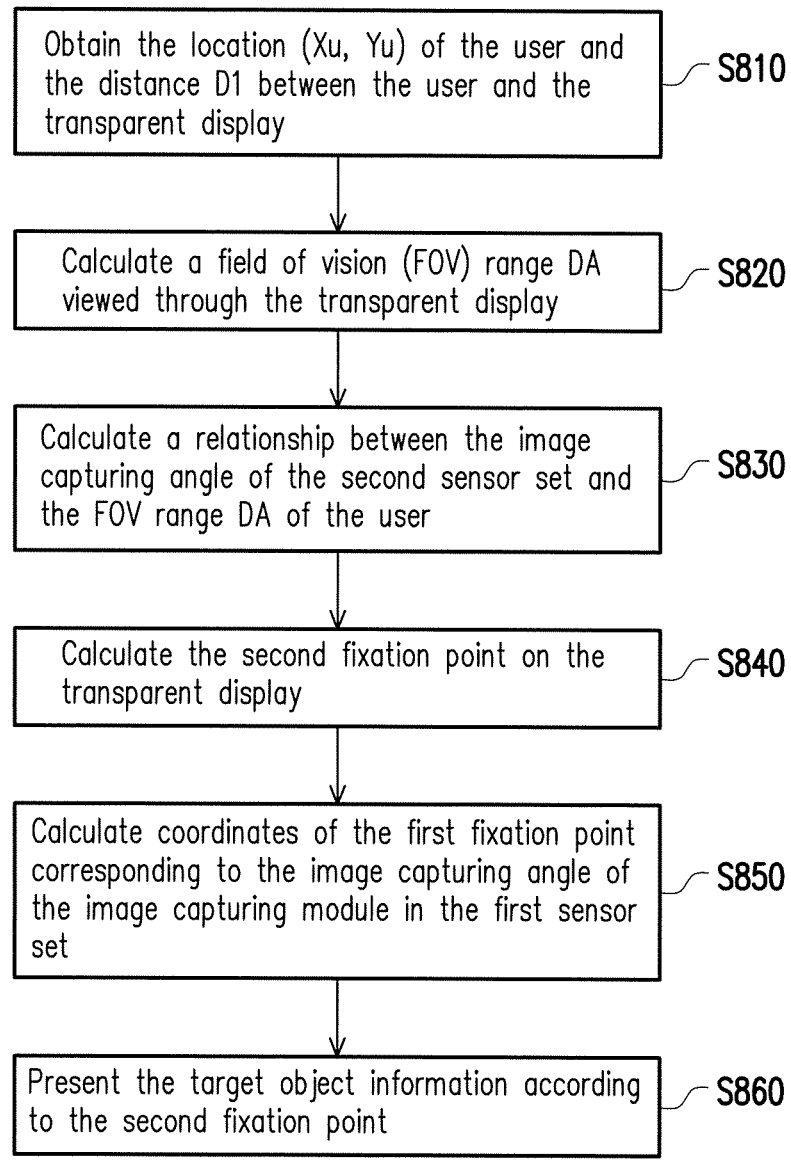
FIG. 8 is a flowchart illustrating a control method of the corresponding transparent display device according to the third embodiment of the disclosure.

FIG. 7 is a schematic diagram of a transparent display device according to a third embodiment of the disclosure. FIG. 8 is a flowchart illustrating a control method of the corresponding transparent display device according to the third embodiment of the disclosure. In step S810 of FIG. 8, the controller 140 obtains the location (Xu, Yu) of the user 150 and the distance D1 between the user 150 and the transparent display 110 through the first sensor set 120.

In the present embodiment, a width W of the transparent display 110 is relatively small, such that a field of vision (FOV) range DA of the transparent display 110 is smaller than an image capturing range CA of the image capturing device in the second sensor set 130. The image capturing range CA may be regarded as the image taking plane of the aforementioned embodiments. Therefore, after the controller 140 obtains the location (Xu, Yu) of the user 150 and the distance D1 between the user 150 and the transparent display 110 through the first sensor set 120, in step S820 of FIG. 8, the controller 140 calculates the FOV range DA viewed through the transparent display 110 according to the location (Xu, Yu). Then, the controller 140 obtains the scene information within the FOV range DA through the second sensor set 130 without obtaining all of the scene information within the image capturing range CA. Namely, the FOV range DA is smaller than the image capturing range CA of the second sensor set 130 capturing the scene information.

Moreover, in step S830 of FIG. 8, the controller 140 requires to calculate a relationship between the image capturing angle φ of the second sensor set 130 and the FOV range DA of the user 150. Since the scene information in the FOV range DA is a part of the scene information in the image capturing range CA, the target object 161 in the image capturing range CA is changed to an imaging object 164. If the object distance D2 between the target object 161 and the transparent display 110 is far greater than the distance D1 between the user 150 and the transparent display 110, the image capturing angle φ is equal to the gaze angle θ of the user 150; otherwise, the image capturing angle φ is calculated through a following equation F4 according to the gaze angle θ of the user 150, the width W of the transparent display 110, the object distance D2 and the distance D1.

$$\Phi == \tan^{-1}\left(W \times \left(\frac{D1+D2}{D1}\right) \times D2\right) \quad \text{F4}$$

In this way, the algorithm analysis module 230 in the controller 140 may calculate the second fixation point FP2 on the transparent display 110 according to above data (step S840 of FIG. 8). Moreover, the algorithm analysis module 230 in the controller 140 may also use the above data to calculate coordinates of the first fixation point FP1 corresponding to the image capturing angle of the image capturing module in the first sensor set 120 (step S850 of FIG. 8). In step S860 of FIG. 8, the information display module in the controller 140 presents the target information (for example, guide information) according to the second fixation point FP2.

Figure 9:
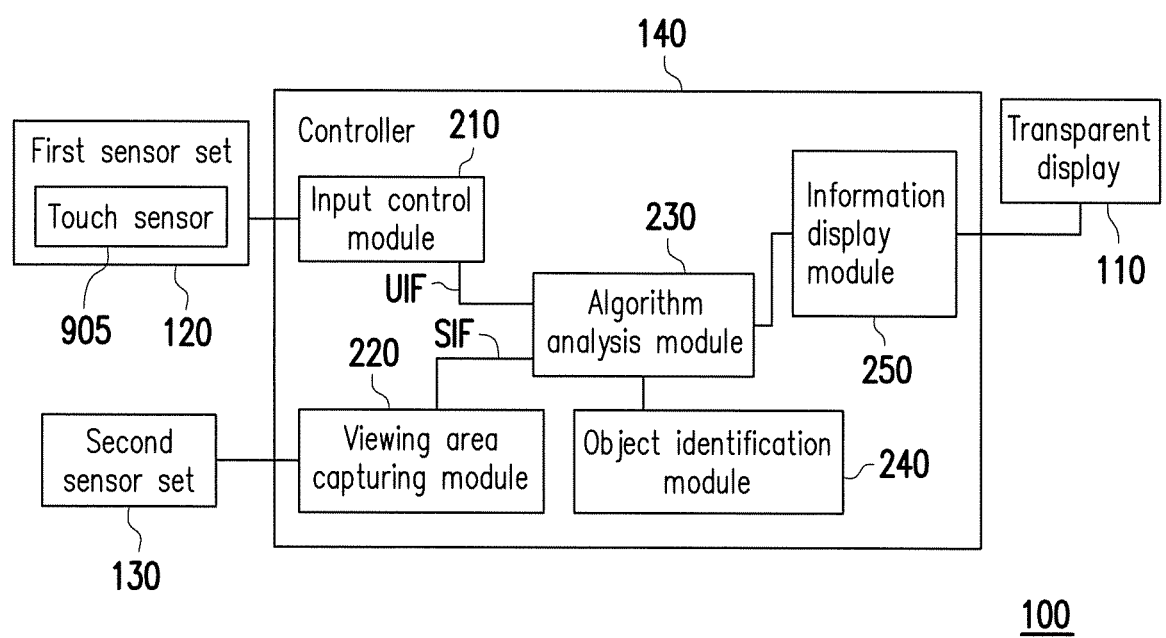
FIG. 9 is a block diagram of a transparent display device according to a fourth embodiment of the disclosure.
Figure 10:
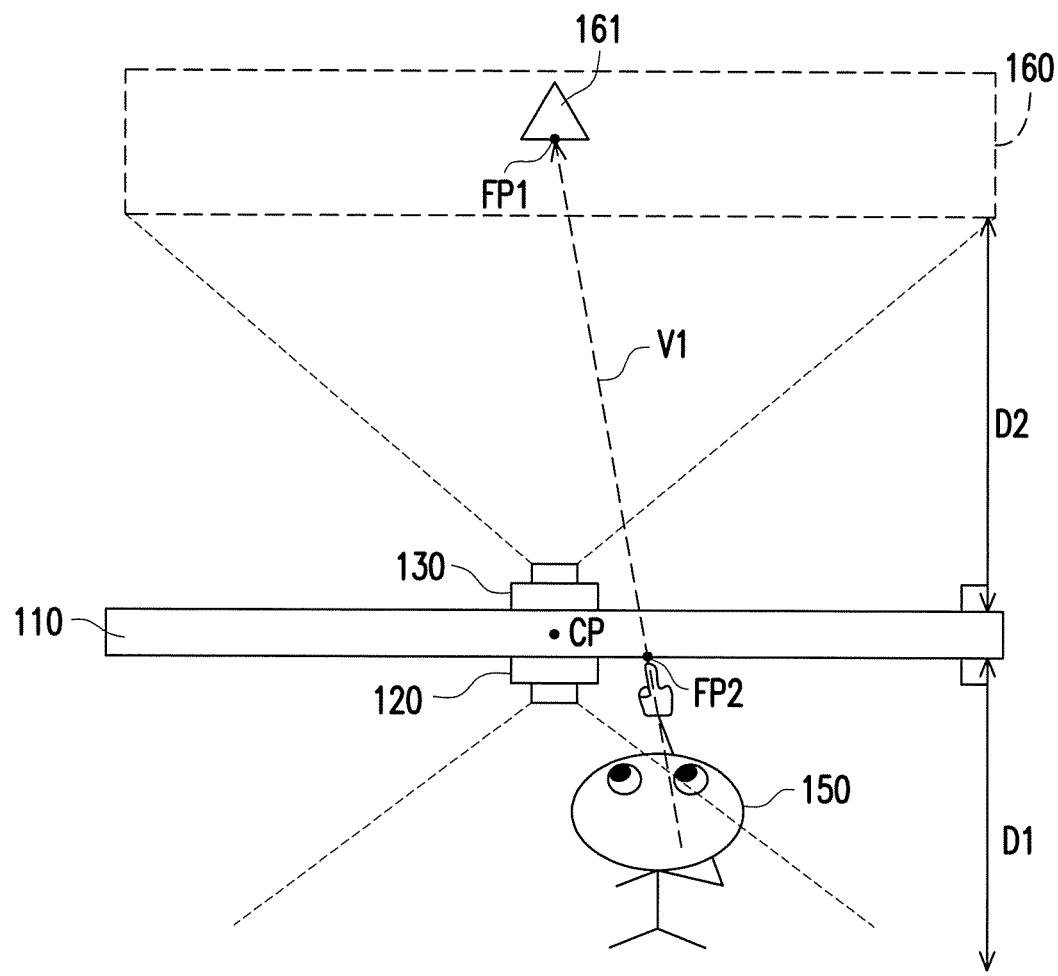
FIG. 10 is a schematic diagram of the transparent display device according to the fourth embodiment of the disclosure.

FIG. 9 is a block diagram of a transparent display device according to a fourth embodiment of the disclosure. FIG. 10 is a schematic diagram of the transparent display device according to the fourth embodiment of the disclosure. A difference between the embodiments of FIG. 9 and FIG. 2 is that the first sensor set 120 of FIG. 9 includes a touch sensor 905. A sensing area of the touch sensor 905 is disposed at the first side (i.e. the first side facing the user 150) of the transparent display 110. Referring to FIG. 9 and FIG. 10, when the user 150 touches the transparent display 110 by hand, the touch sensor 905 of FIG. 9 may obtain a touch point of the user 150 in the first side of the transparent display 110. In the present embodiment, the touch point is regarded as the second fixation point FP2 of the user 150 on the transparent display 110. In this way, the controller 140 of FIG. 9 may directly obtain the coordinates of the second fixation point FP2, such that display of the target object information, calculation of the gaze direction V1 and identification of the target object 161 are more accurate.

Figure 11:
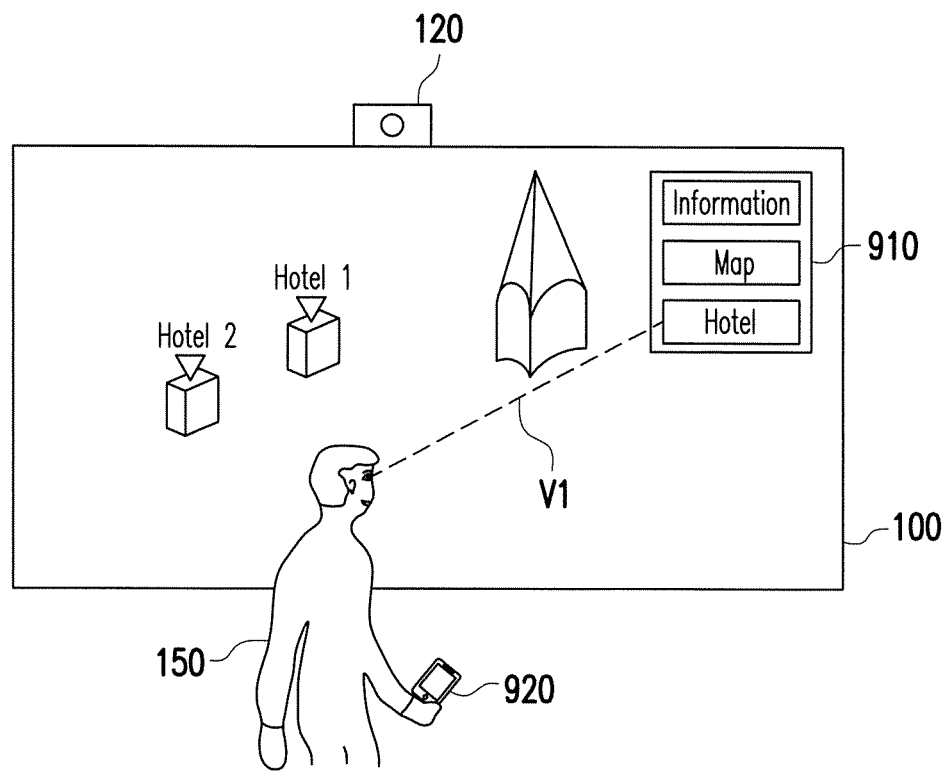
FIG. 11 is a schematic diagram of a transparent display device according to a fifth embodiment of the disclosure.

FIG. 11 is a schematic diagram of a transparent display device according to a fifth embodiment of the disclosure. In FIG. 11, the controller of the transparent display device 100 may provide a user interface 910 according to the gaze direction V1, a touch operation, voice information of the user 150 or a gesture of the user 150, so as to provide information for the scene information gazed by the user 150 through the transparent display in the transparent display device 100. The user 150 may also control the user interface 910 provided by the transparent display device 100 through related application software in a user device 920. For example, when the user 150 continuously gazes a "hotel" option in the user interface 910, the controller of the transparent display device 100 may learn such situation through the first sensor set 120, and mark all of hotels in the current scene information. The user 150 may also implement corresponding functions by touching options in the user interface 910, or performing corresponding gestures, so as to implement interactive operations between the user 150 and the transparent display device 100.

The transparent display device of the present embodiment may further support multiple users at the same time. When distances among the target objects gazed by the multiple users are close to each other, the information display module in the controller 140 may avoid overlap display of different target object information, and integrally present these target object information as much as possible in other manners.

In the disclosure, besides that the first sensor set is applied to obtain the locations and the gaze directions of the users, "a user viewing behaviour analysis algorithm" may also be adopted to determine user characteristics (for example, ages, genders, nationalities, etc.), and a priority order of the proper target object information is arranged for the different users according to the aforementioned characteristics. Even more, the transparent display device of the disclosure may push advertisings based on the corresponding characteristics of the users, so as to improve an application range of the transparent display device.

Figure 12:
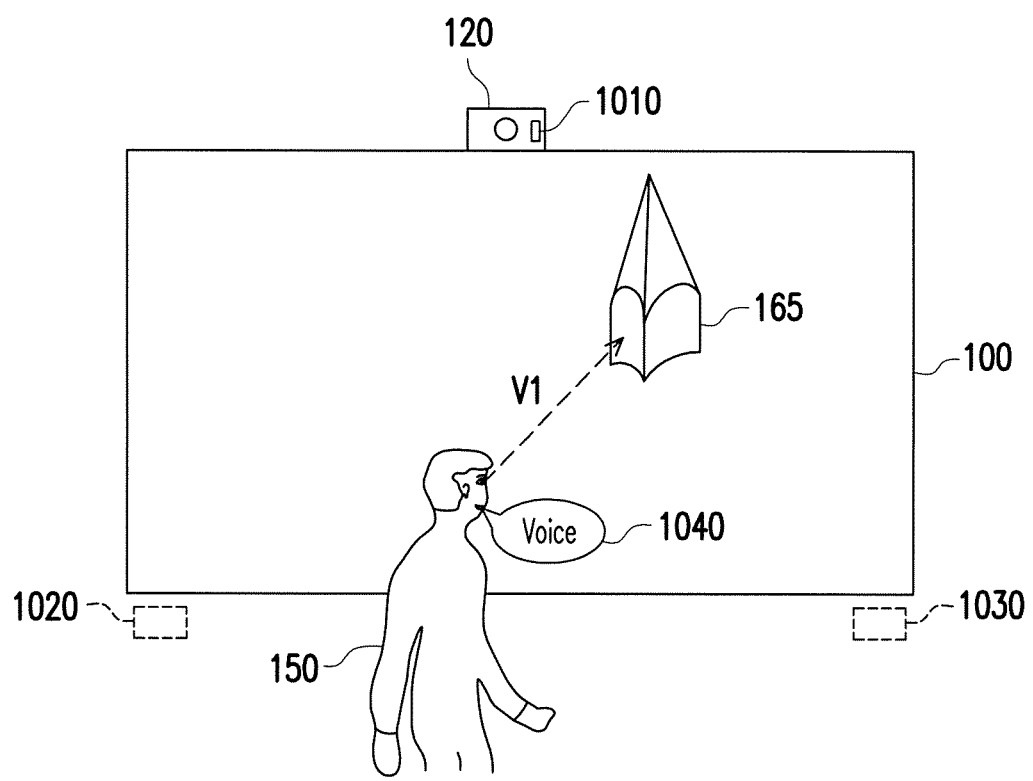
FIG. 12 is a schematic diagram of a transparent display device according to a sixth embodiment of the disclosure.
Figure 13:
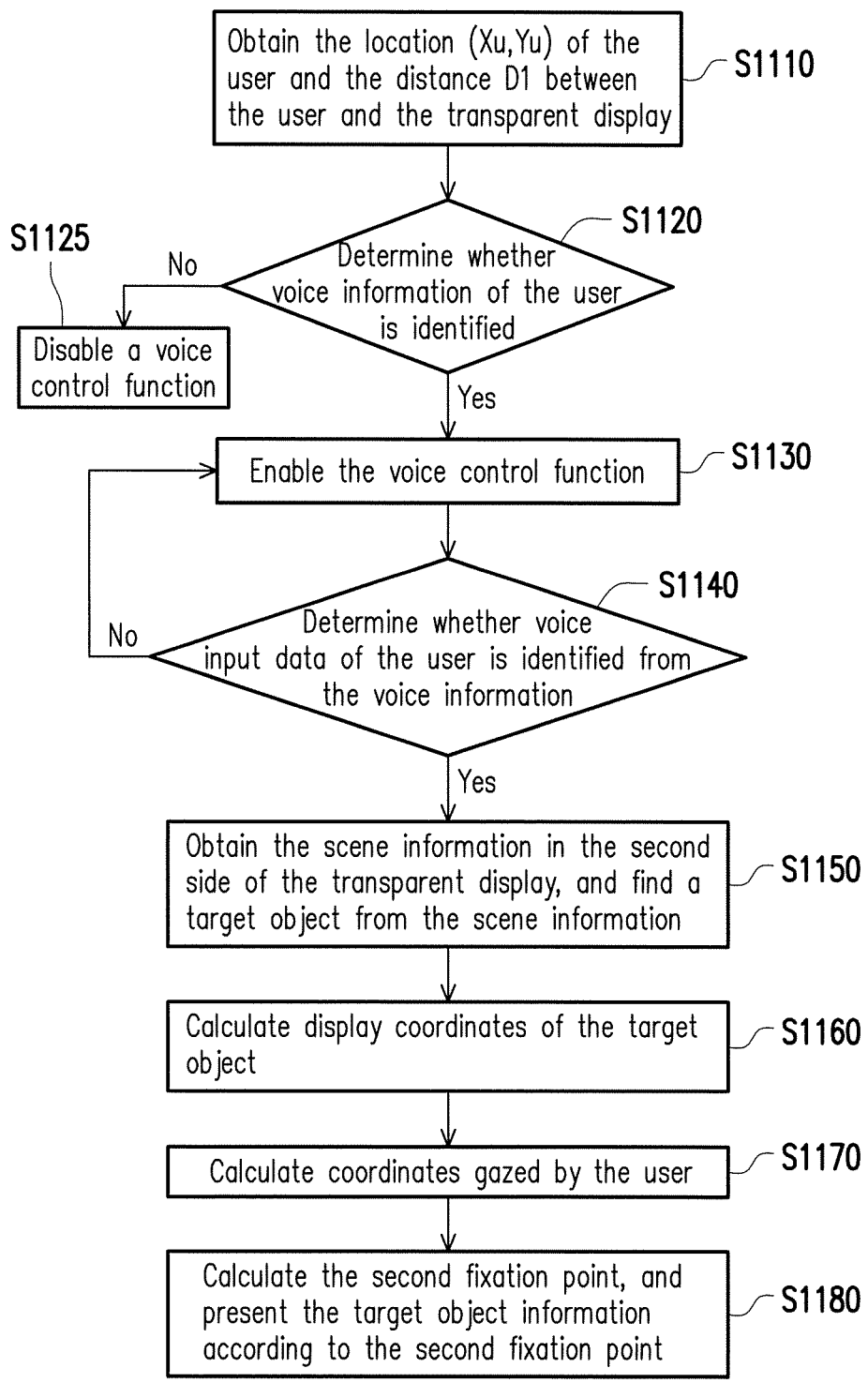
FIG. 13 is a flowchart illustrating a control method of the transparent display device according to the sixth embodiment of the disclosure.

FIG. 12 is a schematic diagram of a transparent display device according to a sixth embodiment of the disclosure. FIG. 13 is a flowchart illustrating a control method of the transparent display device according to the sixth embodiment of the disclosure. Referring to FIG. 12 and FIG. 13, the first sensor set 120 may further include an audio capturing device 1010. The audio capturing device 1010 may be disposed in the first sensor set 120, or disposed at other locations near the user 150 (for example locations 1020, 1030, etc.). In step S1110 of FIG. 13, the controller in the transparent display device 100 obtains the location (Xu, Yu) of the user and the distance D1 between the user and the transparent display through the image capturing device in the first sensor set 120. In step S1120, the controller obtains surrounding audio information to determine whether voice information of the user 150 is identified, as shown by the voice information 1040 of FIG. 12.

When the voice information 1040 of the user 150 cannot be identified from the audio information, the controller may disable a voice control function to save power (step S1125). When the voice information 1040 of the user 150 may be identified from the audio information, a step S1130 is executed, by which the controller automatically enables the voice control function to determine whether voice input data of the user 150 is identified from the voice information 1040 (step S1140). The so-called "voice input data" may be an operation request provided by the user 150 in a voice manner, for example, "where is a building A?", "please search the building A", "help me to find a location of the building A", etc., and the controller may help the user to indicate the location of the building A to be viewed or to perform a corresponding operation through following steps S1150-S1180. If the voice input data of the user 150 cannot be identified from the voice information 1040, the method flow returns to the step S1130 to continually obtain the new voice information 1040.

When the voice input data of the user 150 is identified from the voice information 1040, the image capturing device of the second sensor set 130 obtains the scene information in the second side of the transparent display (step S1150), and finds a target object 165 (for example, the building A) from the scene information. The controller of the transparent display device 100 calculates display coordinates (step S1160) of the target object 165 (the building A) (step S1160). The controller calculates coordinates (Xt, Yt) gazed by the user according to the display coordinates, the location of the user and the distance D1 (step S1170). The calculation method of the coordinates (Xt, Yt) is shown as the equation F3 of the aforementioned embodiment. The controller of the transparent display device may calculate the second fixation point FP2 located on the transparent display device 100 and between the user 150 and the target object 165 according to the coordinates (Xt, Yt), and presents the target object information (for example, the dotted frame encircling the building A, the guide info nation of the building A, etc.) according to the second fixation point FP2 (step S1180). In this way, the voice control function may be implemented through the transparent display device 100.

Figure 14:
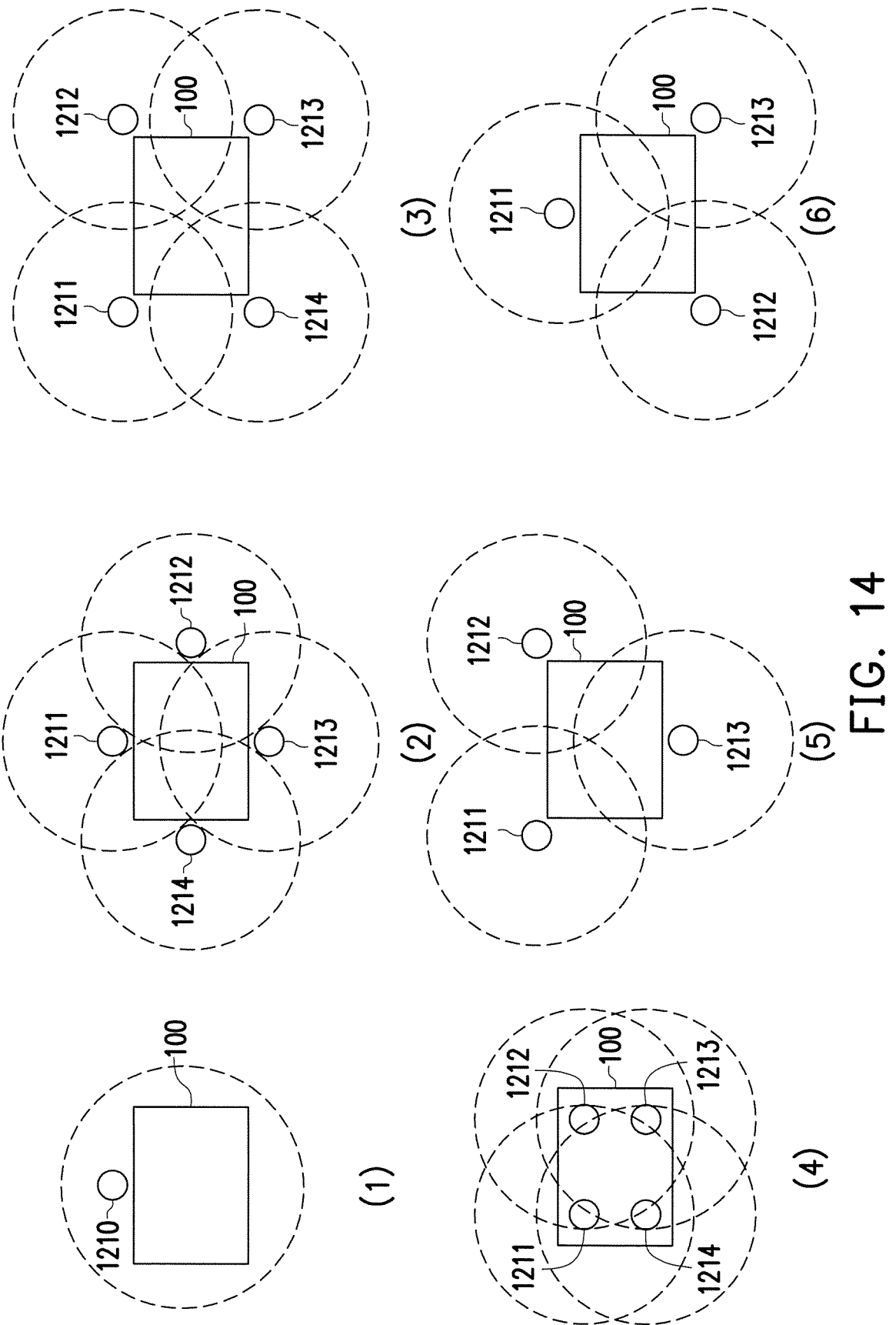
FIG. 14 is a schematic diagram of configurations of image capturing devices of a second sensor set in the transparent display device according to a seventh embodiment of the disclosure.

The second sensor set 130 in the transparent display device used for capturing external images may have a plurality of image capturing device, and placing positions and angles of the image capturing devices in the second sensor set 130 may be designed according to a viewing requirement on the external scene. FIG. 14 is a schematic diagram of configurations of image capturing devices of the second sensor set 130 in the transparent display device according to a seventh embodiment of the disclosure. A plurality of image capturing devices 1210-1214 is applied in FIG. 14 to describe the placing positions of the image capturing devices. The image capturing devices 1210-1214 may be implemented by charge coupled devices (CCDs).

If most of the scenery is located at a top part the of transparent display device 100 viewing from the transparent display device 100 towards the second side, as shown in (1) of FIG. 14, the image capturing device 1210 may perform the image capturing operation towards the top, or the image capturing devices 1211-1213 are configured as that shown in (5) of FIG. 14, and the image capturing devices 1211 and 1212 perform the image capturing operation towards the top, so as to perform high-resolution image capturing operation to the scenery at the top, and the image capturing device 1213 performs the image capturing operation towards the front. If the scenery is generally and widely dispersed in a horizontal direction and/or a vertical direction in front of the transparent display device 100, as shown in (2) of FIG. 14, the image capturing devices 1211-1213 may be disposed at middle positions of four sides of the transparent display device 100.

If the scenery covers all directions of the transparent display device 100, as shown in (3) of FIG. 14, the image capturing devices 1211-1214 may be disposed at external positions of four corners of the transparent display device 100. If the scenery is mainly located in the front of the transparent display device 100, and it hopes to obtain high-resolution images, as shown in (4) of FIG. 14, the image capturing devices 1211-1214 may be disposed at internal positions of the four corners of the transparent display device 100. If most of the scenery is located at a bottom part of the transparent display device 100 viewing from the transparent display device 100 towards the second side, the image capturing devices 1211-1213 may be disposed as that shown in (6) of FIG. 14, and the image capturing devices 1212 and 1213 may perform the image capturing operation towards the bottom, so as to perform high-resolution image capturing operation to the scenery at the bottom, and the image capturing device 1211 performs the image capturing operation towards the front.

Figure 15:
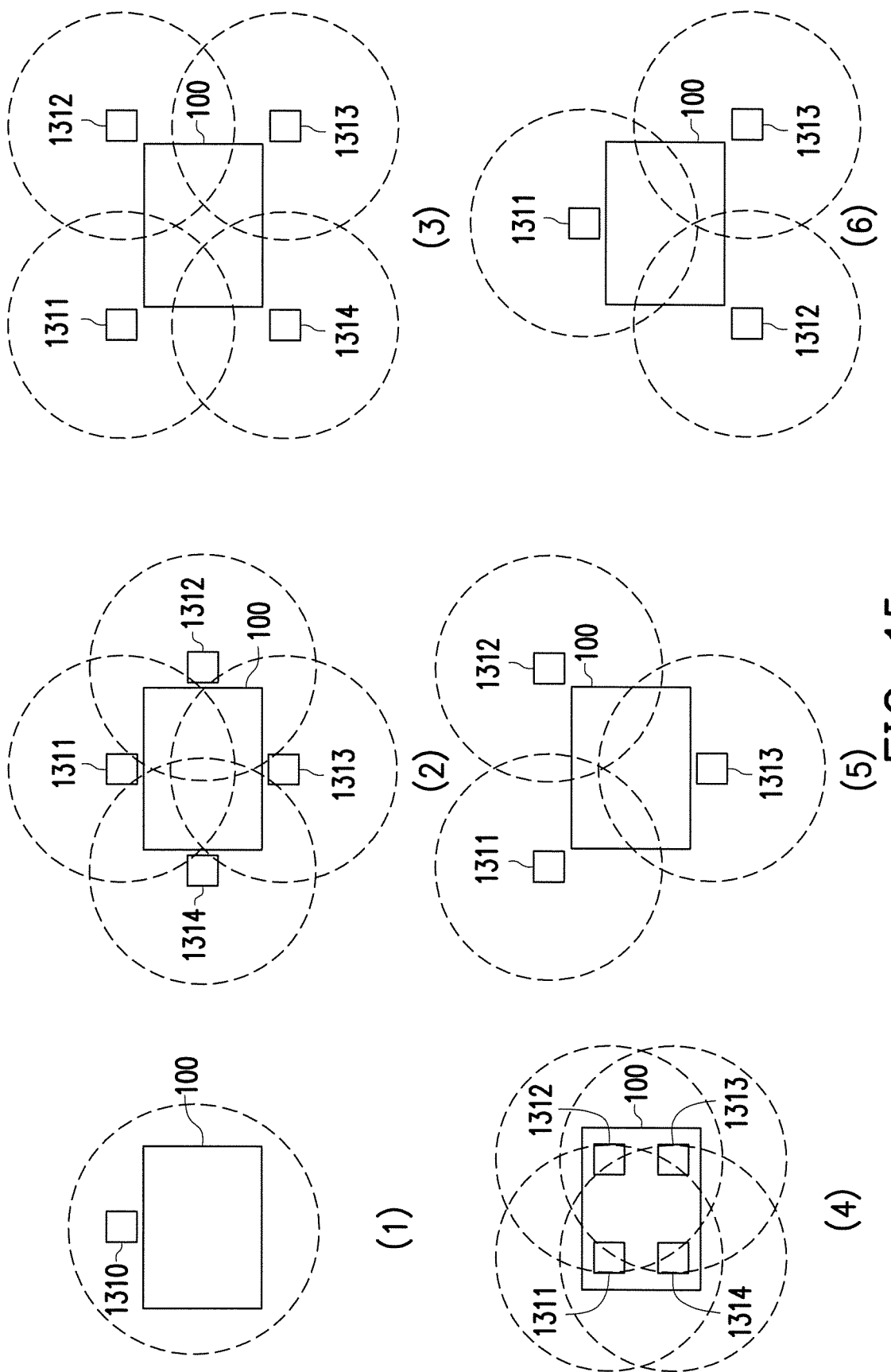
FIG. 15 is a schematic diagram of configurations of image capturing devices of a first sensor set in the transparent display device according to an eighth embodiment of the disclosure.

On the other hand, the first sensor set 120 in the transparent display device used for capturing internal images may also have a plurality of image capturing device, and placing positions and angles of the image capturing devices in the first sensor set 120 may be designed according to a position requirement of the user. FIG. 15 is a schematic diagram of configurations of image capturing devices of the first sensor set 120 in the transparent display device according to an eighth embodiment of the disclosure. A plurality of image capturing devices 1310-1314 is applied in FIG. 15 to describe the placing positions of the image capturing devices. The image capturing devices 1310-1314 may be implemented by charge coupled devices (CCDs).

In case that a height of the user is relatively high or an adult views the transparent display device 100, as shown in (1) of FIG. 15, the image capturing device 1310 performs the image capturing operation towards the front, or the image capturing devices 1311-1313 are configured as that shown in (5) of FIG. 15, and the image capturing devices 1311 and 1312 perform the image capturing operation towards the top, so as to perform a high-resolution image capturing operation based on the height of the user by covering a larger image capturing range, and the image capturing device 1313 performs the image capturing operation towards the front. When a display range of the transparent display device 100 is large, the image capturing devices 1311-1314 may be disposed at middle positions of four sides of the transparent display device 100, as that shown in (2) of FIG. 15.

Considering that different users have different heights, the image capturing devices 1311-1314 may be disposed at external positions of four corners of the transparent display device 100 as that shown in (3) of FIG. 15. Considering that different users have different heights, and it hopes to obtain high-resolution user images, as shown in (4) of FIG. 15, the image capturing devices 1311-1314 may be disposed at internal positions of the four corners of the transparent display device 100. Considering that the most of the users are short in height (for example, children), the image capturing devices 1311-1313 may be disposed as that shown in (6) of FIG. 15, and the image capturing devices 1312 and 1313 perform the image capturing operation towards the bottom, and the image capturing device 1311 performs the image capturing operation towards the front.

In summary, the transparent display device of the embodiments of the disclosure may respectively sense the user location in the first side of the transparent display and the scene information in the second side of the transparent display through the first sensor set and the second sensor set, and may quickly correspond the coordinates and the gaze direction of the user to the target object in the scene information through multiple methods described in the embodiments of the disclosure, so as to opportunely present the related information of the target object on the transparent display located between the user and the target object to implement the AR function. In other words, the transparent display device of the disclosure may sense the gaze direction of the user through the first sensor set in case that the transparent display device and the user are spaced by a distance, so as to quickly display or present related information according to the target object gazed by the user, and the related information may be directly displayed near the target object. Moreover, since the display area of the transparent display device is visually transparent, a chance of blocking the scenery is decreased.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A transparent display device, comprising:
    a transparent display, comprising a first side and a second side opposite to the first side, wherein a display area of the transparent display is visually transparent;
    a first sensor set, sensing user information of a user located in the first side;
    a second sensor set, sensing scene information comprising an integration of an image capturing plane of the second sensor set and a plurality of objects in the image capturing plane in the second side; and
    a controller, coupled to the transparent display, the first sensor set and the second sensor set, wherein
    the controller receives the user information sensed by the first sensor set to analyze and determine a location and a gaze direction of the user, and the controller calculates a first fixation point in the scene information and a second fixation point on the transparent display according to the location and the gaze direction of the user, wherein the first fixation point is defined as a point on the image capturing plane integrated in the scene information that is calculated according to the location and the gaze direction of the user, and the second fixation point is defined as a position on the transparent display that is calculated according to the location of the user, a gaze angle of the user and a distance between the user and the transparent display,
    the controller determines a target object corresponding to the first fixation point according to the scene information, inquires target object information corresponding to the target object, and controls the transparent display to present the target object information according to the second fixation point, wherein the target object corresponding to the first fixation point is one of the objects in the image capturing plane that is determined by the controller as to be gazed by the user according to the scene information, and the target object information comprises information related to the target object that is stored in the controller and configured to be displayed by the transparent display according to the second fixation point.

2. The transparent display device as claimed in claim 1, wherein the controller obtains the location and the gaze direction of the user through the first sensor set, and extends the gaze direction to a place of the scene information in the second side of the transparent display to obtain the first fixation point, searches whether the scene information comprises the target object according to a location of the first fixation point, and extends the gaze direction to the transparent display to obtain the second fixation point on the transparent display.

3. The transparent display device as claimed in claim 2, wherein the gaze direction is generated according to the location of the user and a gaze angle of the user or according to touch information coordinates produced by the user in the first side of the transparent display.

4. The transparent display device as claimed in claim 1, wherein the controller calculates a field of vision range viewed through the transparent display according to the location of the user, so as to obtain the scene information in the field of vision range from the second sensor set.

5. The transparent display device as claimed in claim 1, wherein the first sensor set comprises:
    a first image capturing device, coupled to the controller, and obtaining an image of the first side of the transparent display, wherein the image comprises the user.

6. The transparent display device as claimed in claim 5, wherein the first sensor set further comprises a touch sensor, the touch sensor obtains a touch point of the user in the first side of the transparent display, and the touch point corresponds to the second fixation point on the transparent display.

7. The transparent display device as claimed in claim 1, wherein the controller provides a user interface according to the gaze direction, a touch operation, voice information of the user or a gesture of the user, so as to provide information for the scene information through the transparent display.

8. The transparent display device as claimed in claim 1, wherein the controller cuts the scene information to obtain a plurality of sub scene information by using a clustering algorithm, determines that the first fixation point of the user is located at concerned sub scene information of one of the sub scene information, and takes the concerned sub scene information as the target object.

9. The transparent display device as claimed in claim 1, wherein the second sensor set comprises a second image capturing device.

10. A control method of a transparent display device, wherein the transparent display device comprises a transparent display, a first sensor set and a second sensor set, the control method comprising:

sensing user information of a user located in a first side of the transparent display;

sensing scene information comprising an integration of an image capturing plane of the second sensor set and a plurality of objects in the image capturing plane in a second side of e transparent display, wherein the second side is opposite to the side;

analyzing and determining a location and a gaze direction of the user according to the user information;

calculating a first fixation point in the scene information and a second fixation point on the transparent display according to the location and the gaze direction of the user, wherein the first fixation point is defined as a point on the image capturing plane integrated in the scene information that is calculated according to the location and the gaze direction of the user, and the second fixation point is defined as a position on the transparent display that is calculated according to the location of the user, a gaze angle of the user and a distance between the user and the transparent display;

determining a target object corresponding to the first fixation point according to the scene information, wherein the target object corresponding to the first fixation point is one of the objects in the image capturing plane that is determined to be gazed by the user according to the scene information; and inquiring target object information corresponding to the target object, and controlling the transparent display to present the target object information according to the second fixation point, wherein the target object information comprises information related to the target object that is stored in the controller and configured to be displayed by the transparent display according to the second fixation point.

11. The control method of the transparent display device as claimed in claim 10, wherein the step of calculating the first fixation point in the scene information and the second fixation point on the transparent display according to the location and the gaze direction of the user comprises:

extending the gaze direction to a place of the scene information in the second side of the transparent display to obtain the first fixation point;

searching whether the scene information comprises the target object according to a location of the first fixation point; and extending the gaze direction to the transparent display to obtain the second fixation point on the transparent display.

12. The control method of the transparent display device as claimed in claim 10, further comprising:

controlling an image capturing device in the second sensor set to translate to a location closest to the location of the user after the location of the user is obtained.

13. The control method of the transparent display device as claimed in claim 10, further comprising:

calculating a field of vision range viewed through the transparent display according to the location of the user, so as to obtain the scene information in the field of vision range from the second sensor set.

14. The control method of the transparent display device as claimed in claim 10, further comprising:

providing a user interface according to the gaze direction, a touch operation, voice information of the user or a gesture of the user, so as to provide information for the scene information through the transparent display.

15. The control method of the transparent display device as claimed in claim 10, wherein the step of determining the target object corresponding to the first fixation point according to the scene information comprises:

cutting the scene information to obtain a plurality of sub scene information by using a clustering algorithm;

determining that the first fixation point of the user is located at concerned sub scene information of one of the sub scene information; and taking the concerned sub scene information as the target object.

16. A controller, adapted to a transparent display device, and configured to:

receive user information of a user located in a first side of the transparent display device, and analyze and determine a location and a gaze direction of the user according to the user information;

receive scene information comprising an integration of a captured image of a second side of the transparent display device and a plurality of objects in the captured image;

calculate a first fixation point in the scene information and a second fixation point on a transparent display of the transparent display device according to the location and the gaze direction of the user, wherein the first fixation point is defined as a point on an image capturing plane of the captured image integrated in the scene information that is calculated according to the location and the gaze direction of the user, and the second fixation point is defined as a position on the transparent display that is calculated according to the location of the user, a gaze angle of the user and a distance between the user and the transparent display;

determine a target object corresponding to the first fixation point according to the scene information, wherein the target object corresponding to the first fixation point is one of the objects in the captured image that is determined to be gazed by the user according to the scene information;

inquire target object information corresponding to the target object, wherein the target object information comprises information related to the target object that is stored in the controller; and control the transparent display to present the target object information according to the second fixation point.

17. The controller as claimed in claim 16, further configured to: extend the gaze direction to a place of the scene information in the second side of the transparent display to obtain the first fixation point, search whether the scene information comprises the target object according to a location of the first fixation point, and extend the gaze direction to the transparent display to obtain the second fixation point on the transparent display.

18. The controller as claimed in claim 17, wherein the gaze direction is generated according to the location of the user and a gaze angle of the user or according to touch information coordinates produced by the user in the first side of the transparent display.

19. The controller as claimed in claim 16, further configured to: determine an object distance between the target object in the first fixation point and the transparent display, and determine a scene mode according to the object distance, and selectively obtain the required user information from a plurality of devices in a first sensor set according to the scene mode, calculate, from the captured image, coordinates of the first fixation point on the image capturing plane of a second sensor set according to the scene mode.

20. The controller as claimed in claim 16, further configured to calculate a field of vision range viewed through the transparent display according to the location of the user, so as to obtain the scene information in the field of vision range from the second sensor set.

* * * * *